United States Patent [19]
Van Ordt

[11] 3,984,076
[45] Oct. 5, 1976

[54] ADJUSTABLE ARTICLE MOUNTING BRACKET

[76] Inventor: Jay H. Van Ordt, 10871 S. Grand Ave., Ontario, Calif. 91762

[22] Filed: Aug. 1, 1975

[21] Appl. No.: 601,230

[52] U.S. Cl. .............................. 248/539; 343/715; 403/87
[51] Int. Cl.² .................. A01K 97/10; F16C 11/00
[58] Field of Search ................ 248/38, 42, 43, 288; 403/87, 101, 123; 343/713, 714, 715 X, 881, 882

[56] References Cited
UNITED STATES PATENTS

| | | | |
|---|---|---|---|
| 644,046 | 2/1900 | Albright et al. | 403/87 |
| 1,761,465 | 6/1930 | Chappelow et al. | 403/87 |
| 2,481,272 | 9/1949 | Williams | 248/42 |
| 2,500,784 | 3/1950 | Anderson | 403/123 |
| 3,056,570 | 10/1962 | Slavin | 248/43 |
| 3,071,338 | 1/1963 | Kaufman et al. | 248/43 |
| 3,477,678 | 11/1969 | Icke et al. | 248/288 B |
| 3,521,285 | 7/1970 | Mautner | 343/882 |
| 3,886,560 | 5/1975 | Mortensen et al. | 248/43 |

*Primary Examiner*—Robert A. Hafer
*Attorney, Agent, or Firm*—Boniard I. Brown

[57] ABSTRACT

An adjustable mounting bracket composed of two strap-like bracket members having elongate concavo-convex ends forming generally oval-shaped cup-like coupling elements disposed in ball and socket-like interfitting relation with the convex side of one element positioned in the concave side of the other element and joined by a fastener which may be loosened to permit ball and socket-like relative angular adjustment of the coupling elements in their lengthwise and transverse directions without relative rotation of the elements and about the fastener and thereby relative angular adjustment of the bracket members. One bracket member has means for attachment to a support and the other bracket member has means for attachment to the article to be supported. The particular mounting bracket described is a generally L-shaped bracket for use as an automobile antenna mount.

10 Claims, 6 Drawing Figures

U.S. Patent Oct. 5, 1976 3,984,076
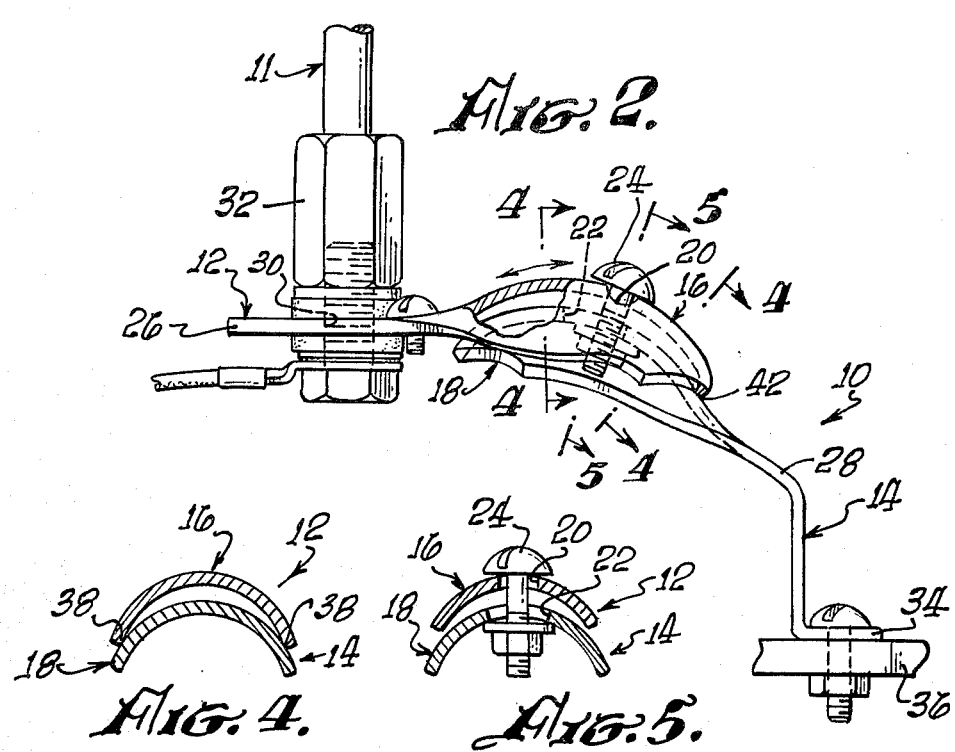
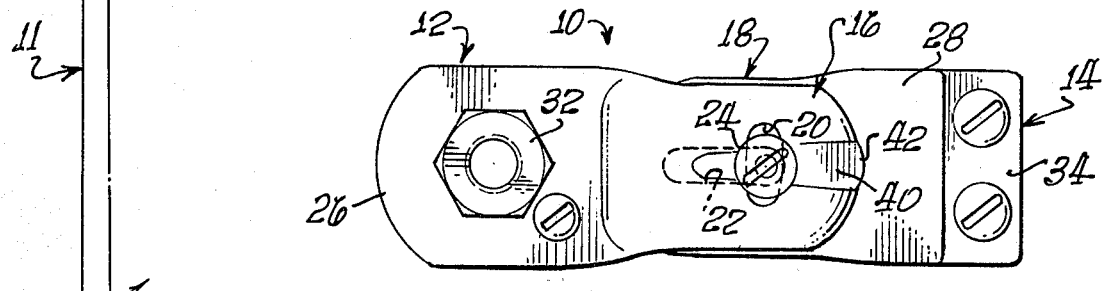
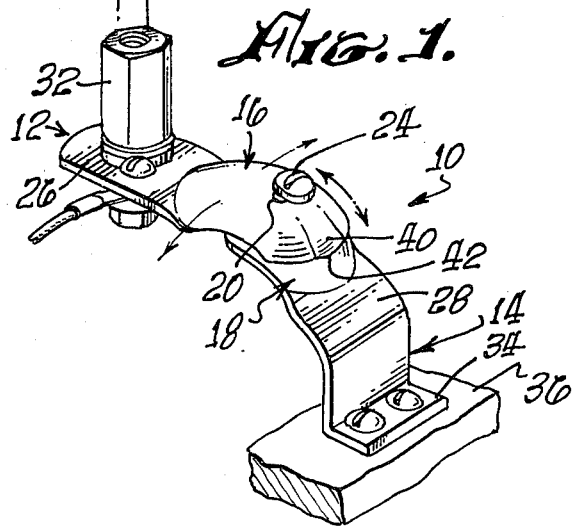
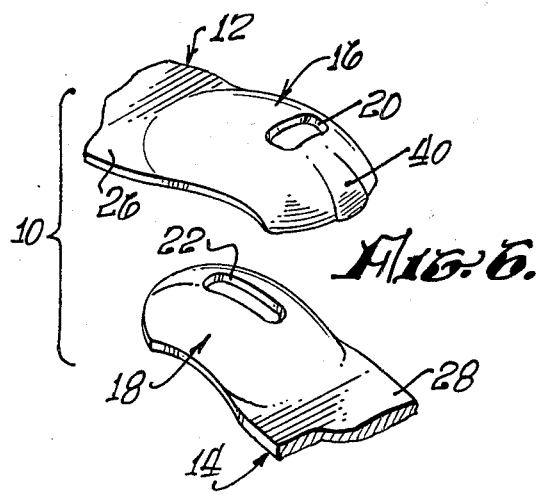

ADJUSTABLE ARTICLE MOUNTING BRACKET

BACKGROUND OF THE INVENTION

1. Field of the Invention

This invention relates generally to mounting brackets and more particularly to a novel mounting bracket for use as an antenna mount and other purposes.

2. Discussion of the Prior Art

As will become evident from the ensuing description, the adjustable bracket of the invention may be used for a variety of purposes. However, the bracket is intended for use as an automobile antenna mount and will be described in this context.

All automobiles which are sold with radios are equipped with a factory installed antenna. In many cases, however, it may be desirable or necessary to install one or more additional antennas for ham radio gear, a radio telephone or the like. This installation presents the problem of mounting the antenna on the automobile body. A variety of antenna mounting brackets, or antenna mounts as they are called, have been devised for this purpose.

SUMMARY OF THE INVENTION

This invention provides an improved adjustable mounting bracket which is particularly adopted for use as an antenna mount but is capable of other uses as well. The mounting bracket comprises a pair of strap-like bracket members constructed of a relatively stiff though flexible material. Each bracket member has an elongate concavo-convex end portion forming a generally oval-shaped cup-like coupling element which is curved to a given radius in the long direction of the element and to a smaller radius in the transverse direction of the element. These coupling elements of the bracket members are disposed in ball and socket-like interfitting relation with their longer sides generally parallel to one another and the convex side of one element, referred to as the convex element, positioned in the concave side of the other element, referred to as the concave element.

The coupling elements are joined by a fastener which may be loosened to permit ball and socket-like relative angular adjustment of the coupling elements and thereby the bracket members in the lengthwise and transverse directions of the elements. The differing longitudinal and transverse radii of curvature of the coupling elements prevent relative rotation of the elements, and thereby also the bracket members, about the axis of the fastener. The fastener may then be tightened to draw the coupling elements into clamping engagement with one another to secure the bracket members in adjusted positions. The bracket members have means for attachment to a support and to an article to be mounted, respectively.

The mounting bracket described is a generally L-shaped bracket whose mutually transverse legs are formed by the outer ends of the two bracket members. The outer end of one member has a right angle apertured flange for attachment to a support and the outer end of the other bracket member has an opening for mounting an antenna. The bracket is adjustable to angularly adjust the antenna in two mutually perpendicular planes.

The concave coupling element conforms to a smaller radius of curvature than the convex coupling element such that when the bracket fastener is released, the concave element engages the convex element only at spaced points about the perimeter of the concave element. Tightening of the fastener deforms the elements into conforming relation to firmly clamp the elements against relative movement and thereby secure the bracket members in adjusted positions.

BRIEF DESCRIPTION OF THE DRAWINGS

FIG. 1 is a perspective view of an automobile antenna mount embodying the invention;

FIG. 2 is an enlarged side elevation, partially in section, of the antenna mounting bracket of the antenna mount in FIG. 1;

FIG. 3 is a top plan view of the bracket;

FIG. 4 is a section taken on lines 4—4 in FIG. 2;

FIG. 5 is a section taken on line 5—5 in FIG. 2; and

FIG. 6 is a fragmentary exploded perspective view of the bracket.

DESCRIPTION OF THE PREFERRED EMBODIMENT

Referring first to FIG. 1, there is illustrated a mounting bracket 10 according to the invention used as a mount for an automobile antenna 11. This antenna mount application is the primary application of the present mounting bracket. As noted earlier, however, and as will appear from the ensuing description, the bracket may be used for other purposes.

The mounting bracket 10 comprises a pair of strap-like bracket members 12 and 14 fashioned from strap metal or other suitable material. Bracket members 12 and 14 have elongate concavo-convex end portions 16 and 18, respectively, which form generally oval-shaped cup-like coupling elements. Each of these coupling elements are curved lengthwise to a relatively large radius, as shown in FIG. 2, and crosswise to a smaller radius, as shown in FIGS. 4 and 5. For reasons which will be explained presently, the radii of curvature of coupling element 16 in its longitudinal and transverse directions are smaller than the corresponding radii of the coupling element 18, as may be readily seen in FIGS. 2, 4 and 5.

The coupling elements 16, 18 are disposed in ball and socket-like interfitting relation with their longer sides generally parallel to one another and the convex side of element 18 engaging within the concave side of element 16. For convenience, element 16 is referred to as a concave element and element 18 as a convex element. Extending through openings or slots 20 and 22 in the coupling elements is a fastener 24 in the form of a bolt and nut which may be tightened to firmly clamp the elements together, as explained below. Slot 20 in coupling element 16 extends crosswise of the respective bracket member 12. Slot 22 in coupling element 18 extends lengthwise of the respective bracket member 14. Slots 20, 22 are thus disposed in mutually perpendicular relation.

The outer end 26 of bracket member 12 and the outer end 28 of bracket member 14 are disposed in mutually transverse relation, such that the mounting bracket 10 has a generally L-shape with legs formed by the outer ends of the bracket members and the coupling elements 16, 18 forming the juncture of the legs. At the outer extremity of bracket member 12 are means 30 for mounting the article to be supported, in this instance a hole for receiving the mounting base 32 of antenna 11. At the outer extremity of bracket member 14 are means 34, in this instance an apertured right angle flange, for attaching the bracket to a support 36. Antenna 11 is a rod or whip type antenna which is supported in an upright position relative to the plane of the mounting flange 34.

From the foregoing description of the mounting bracket or antenna mount 10, it will be understood that when the coupling fastener 24 is loosened, the coupling elements 16, 18 are relatively angularly adjustable in ball and socket like fashion, in their lengthwise and/or crosswise direction to relatively angularly adjust the bracket members 12, 14 and thereby angularly adjust the antenna 11 relative to the plane of the bracket mounting flange 34 in mutually perpendicular planes parallel to and transverse to the plane of the bracket, as indicated by the arrows in FIG. 1. The differing lengthwise and transverse curvatures of the coupling elements prevents relative rotation of the elements and thereby also the bracket members, about the axis of fastener 14.

Because of the differing curvatures of the coupling elements 16, 18, when the fastener 24 is thus loosened, the concave coupling element 16 engages the convex element 18 only at spaced points 38 about the perimeter of the concave element. If desired, the concave element may be flattened at 40 to provide an additional point 42 of contact with the convex element. The coupling elements are spaced at all other points, as shown.

Tightening of the fastener 24 draws the spaced portions of the coupling elements together, thereby deforming the elements into generally conforming relation and firmly clamping the elements together to secure the bracket members 12, 14 in fixed positions. During this deformation, the edges of the concave coupling element 16 are urged firmly against the convex element 18 to firmly lock the elements against relative movement.

The inventor claims:

1. An adjustable article mounting bracket comprising:
   a pair of relatively stiff though flexible strap-like bracket members each including an elongate concavo-convex end portion forming a generally oval-shaped cup-like coupling element which is curved to a given radius in the long direction of the element and to a smaller radius in the transverse direction of the element;
   the coupling elements of the two members being disposed in ball and socket-like interfitting relation with their longer sides generally parallel to one another and the convex side of one element positioned within the concave side of the other element in a manner such that said coupling elements and thereby said bracket members are relatively adjustable in ball and socket-like fashion in the lengthwise and transverse direction of said elements,
   a fastener extending through enlarged openings in said coupling elements for releasibly clamping said elements together and thereby releasibly securing said members in adjusted positions, the differing lengthwise and transverse radii of curvature of said coupling elements preventing relative rotation of said elements and thereby also said members about said fastener,
   means for securing one member to a support, and means on the other member for attachment to the article to be mounted.

2. A bracket according to claim 1 wherein:
said other coupling element has edge portions about the perimeter of its concave side which seat against the convex side of said one coupling element with the center portions of said coupling elements spaced from one another when said fastener is released to permit relative adjustment of said members, whereby tightening of said fastener to clamp said coupling elements together effects deformation of said elements into conforming relation.

3. A bracket according to claim 2 wherein:
the radius of curvature of the convex side of said one coupling element in each of said directions is greater than the radius of curvature of the concave side of the other coupling element in the corresponding direction.

4. A bracket according to claim 3 wherein:
said openings in said coupling elements comprise a slot in one element extending in said lengthwise direction of the respective member and a slot in the other element extending in said transverse direction of the respective member.

5. A bracket according to claim 4 wherein:
the opposite ends of said members are disposed in transverse relation to one another, whereby said bracket has a generally L-shape, and
said opposite end of said one member has an apertured right angle flange constituting said means for securing the latter member to a support.

6. A bracket according to claim 5 wherein:
said bracket comprises an antenna mounting bracket, and said opposite end of the other member has an opening for receiving the base of a whip type antenna and constituting said article attachment means.

7. A bracket according to claim 1 wherein:
said openings in said coupling elements comprise a slot in one coupling element and a slot in the other coupling element at right angles to the first mentioned slot.

8. A bracket according to claim 1 wherein:
the opposite ends of said members are disposed in transverse relation to one another, whereby said bracket has a generally L-shape, and
said opposite end of said one member has an apertured right angle flange constituting said means for securing the latter member to a support.

9. A bracket according to claim 8 wherein:
said bracket comprises an antenna mounting bracket, and said opposite end of the other member has an opening for receiving the base of a whip type antenna and constituting said article attachment means.

10. In combination:
a generally L-shaped antenna mounting bracket comprising a pair of relatively stiff though flexible strap-like bracket members each including an elongate concavo-convex end portion forming a generally oval-shaped cup-like coupling element which is curved to a given radius in the long direction of the element and to a smaller radius in the transverse radius of the element, the coupling elements of the two members being disposed in ball and socket-like interfitting relation with their longer sides generally parallel to one another and the convex side of one element positioned in the concave side of the other element in a manner such that coupling elements and thereby said bracket members are relatively adjustable in ball and socket-like fashion in the lengthwise and transverse directions of said elements, a fastener extending through enlarged opening in said coupling elements for releasibly clamping said coupling elements together to releasibly secure said members in adjusted positions, the differing lengthwise and transverse radii curvature of said coupling elements preventing relative rotation of said elements and thereby said members about said fastener, the opposite ends of said members being disposed in mutually transverse relation to provide said bracket with its L-shape, and said opposite end of one member having an apertured right angle mounting flange for attachment to a support, a whip like antenna having a mounting base secured to said opposite end of the other member, and said members being adjustable to adjust the angular relation of said antenna relative to said mounting flange in mutually perpendicular planes parallel to said lengthwise and transverse directions, respectively, of said coupling elements.

\* \* \* \* \*